United States Patent [19]

Hecq et al.

[11] Patent Number: 5,292,354
[45] Date of Patent: Mar. 8, 1994

[54] METHOD OF PRODUCING DEALKALIZED SHEET GLASS

[75] Inventors: André Hecq, Nalinnes; Camille Dupont, Courcelles; Karel V. Baelen, Mol, all of Belgium

[73] Assignee: Glaverbel, Société Anonyme, Brussels, Belgium

[21] Appl. No.: 985,757

[22] Filed: Dec. 4, 1992

Related U.S. Application Data

[60] Continuation of Ser. No. 798,885, Nov. 27, 1991, abandoned, which is a division of Ser. No. 646,520, Jan. 25, 1991, Pat. No. 5,093,196, which is a continuation of Ser. No. 126,121, Nov. 27, 1987, abandoned.

[30] Foreign Application Priority Data

Dec. 4, 1986 [GB] United Kingdom ............... 8629042

[51] Int. Cl.$^5$ ............................................. C03C 15/00
[52] U.S. Cl. .......................................... 65/31; 65/30.1; 65/60.1
[58] Field of Search ........................... 65/60.1, 30.1, 31

[56] References Cited

U.S. PATENT DOCUMENTS

| | | | |
|---|---|---|---|
| 3,451,796 | 6/1969 | Mochel | 65/31 |
| 3,653,864 | 4/1972 | Rothermel et al. | 65/30 |
| 4,022,947 | 5/1977 | Grubb et al. | 428/432 |
| 4,026,692 | 5/1977 | Bartholomew | 65/30 R |
| 4,107,388 | 8/1978 | Gambaretto et al. | 428/428 |
| 4,340,408 | 7/1982 | McMillan et al. | 65/31 |
| 4,427,488 | 1/1984 | Servais et al. | 156/663 |
| 4,518,222 | 5/1985 | Borelli et al. | 350/167 |
| 4,624,729 | 11/1986 | Bresciani et al. | 156/345 |
| 4,636,439 | 1/1987 | Breininger | 428/428 |

FOREIGN PATENT DOCUMENTS

| | | |
|---|---|---|
| 2515633 | 5/1983 | France. |
| 294391 | 7/1928 | United Kingdom. |
| 705934 | 3/1954 | United Kingdom. |
| 835820 | 5/1960 | United Kingdom. |

OTHER PUBLICATIONS

Ookura, N., "Glass Bottle Provided With Both Mechanical Strength . . . ", *Patent Abstracts of Japan*, vol. 6, No. 227, (C-134) [1105], Nov. 12, 1982.

Wakai, N., "Chemical Resistance Treatment On Glassware", *Chemical Abstracts*, 91:127849t, (JP-A-79 040,816) vol. 91, No. 16, Oct. 1979.

Mochel, E. L., et al., "Strengthening of Glass Surfaces by Sulfur Trioxide Treatment", *J. Am. Ceramic Soc.*, vol. 49, No. 11, Nov. 21, 1966, pp. 585-589.

Uhlmann, D. R., et al. (Eds.), *Glass: Science and Technology*, vol. 1, "Glass-Forming Systems", Ch. 3, III., Soda-Lime Glasses, Academic Press (1983), pp. 146-151.

Pulker, H. K. *Thin Film Science and Technology*, vol. 6, "Coatings on Glass", Elsevier (1984), pp. 120-124.

*Primary Examiner*—Robert L. Lindsay
*Attorney, Agent, or Firm*—Spencer, Frank & Schneider

[57] ABSTRACT

A method of producing dealkalized sheet glass in which sheet glass is dealkalized in stages. The method includes dealkalizing sheet glass in a first stage by exposing the sheet glass to contact with a first dealkalizing medium including at least one acid gas for a period of at least 1 minute while the sheet glass is at a temperature above 400° C.; and further dealkalizing the sheet glass in a subsequent stage by exposing the sheet glass after the first stage to contact with a second dealkalizing medium including at least one acid gas for a period of at least 3 minutes while the sheet glass is at a temperature which is at least 50° C. below one of the temperature of the sheet glass during the first stage and the minimum temperature of the sheet glass during the first stage, and ranges between 400° C. and 250° C.

18 Claims, 2 Drawing Sheets

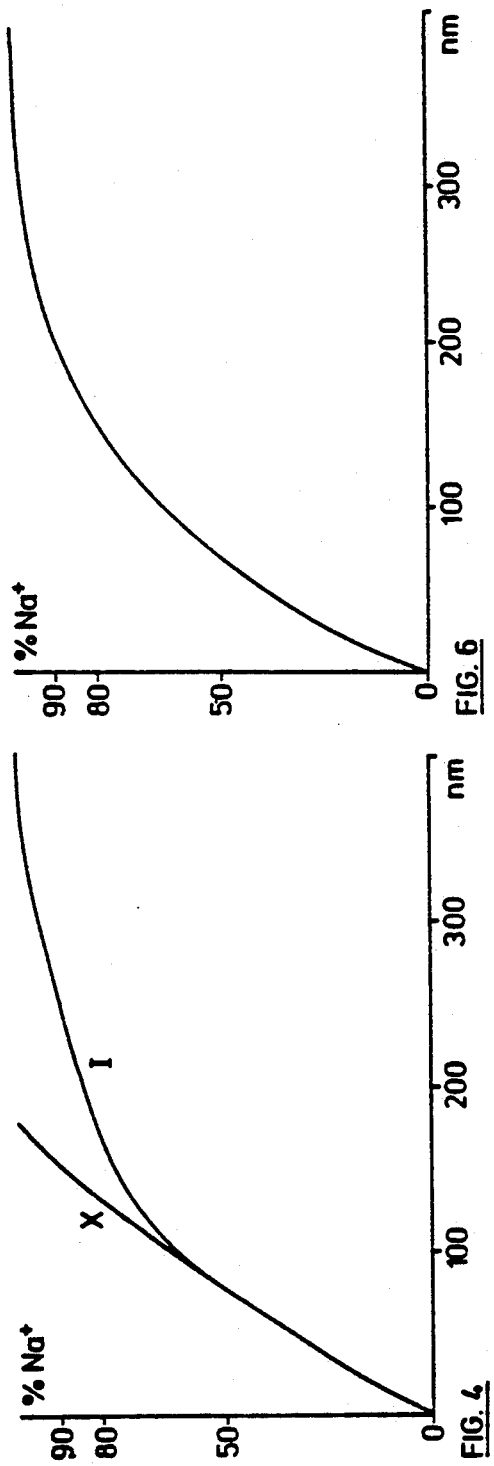
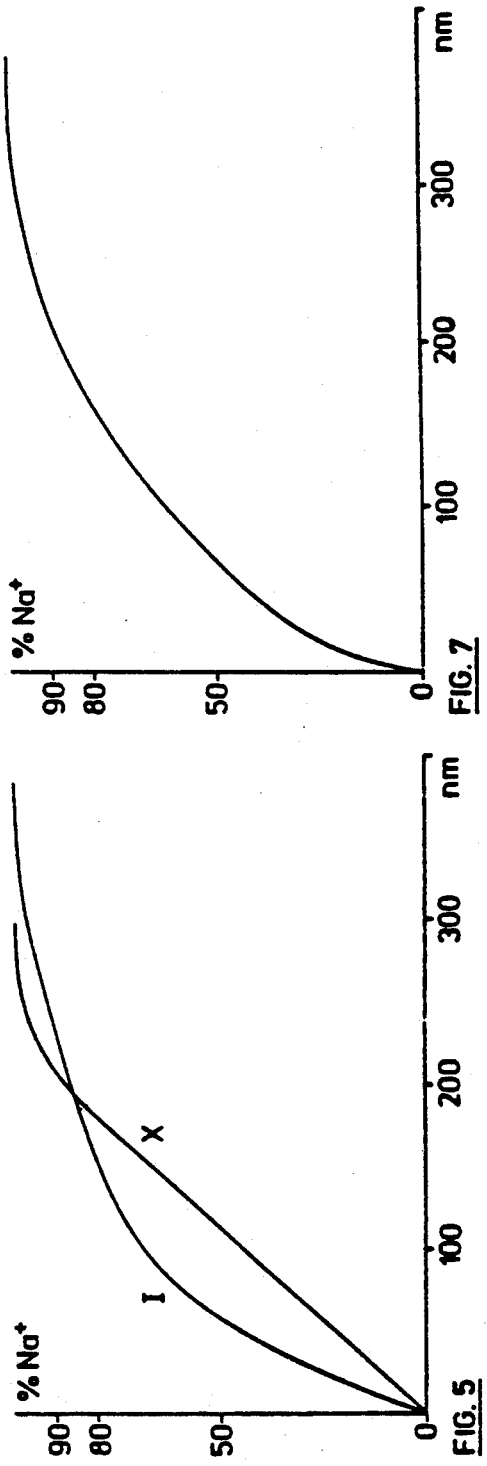
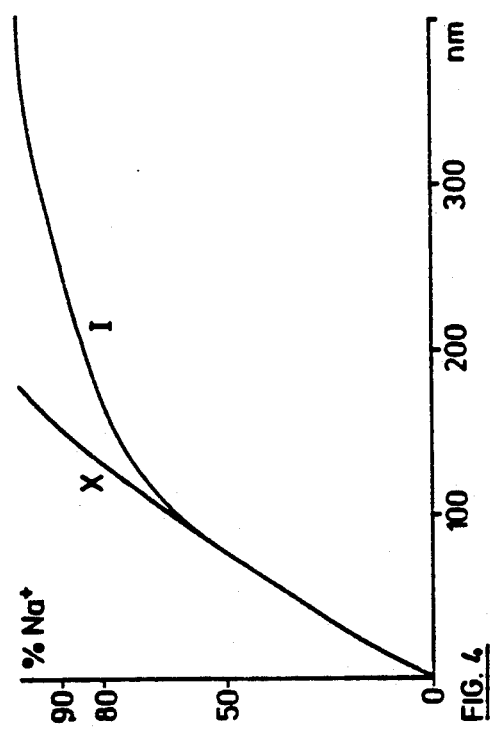
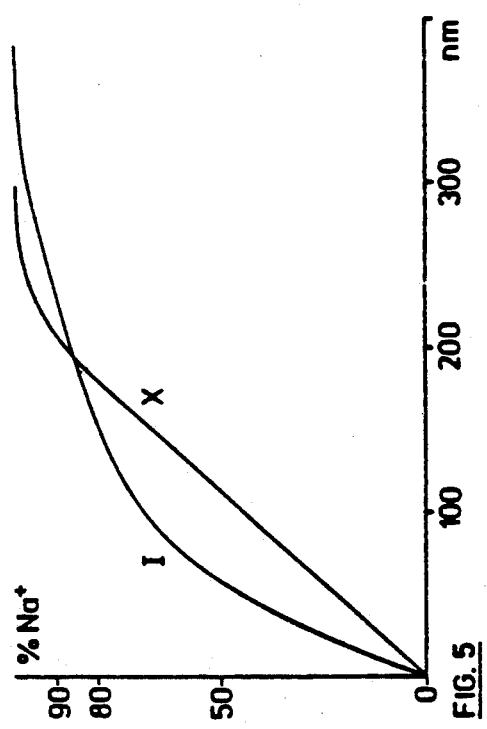
FIG. 4
FIG. 5
FIG. 6
FIG. 7

METHOD OF PRODUCING DEALKALIZED SHEET GLASS

This application is a continuation of Ser. No. 07/798,885, filed Nov. 27, 1991, now abandoned, which is a divisional of Ser. No. 07/646,520, filed Jan. 25, 1991, now U.S. Pat. No. 5,093,196 which is a continuation of Ser. No. 07/126,121, filed Nov. 27, 1987, now abandoned.

BACKGROUND OF THE INVENTION

1. Field of the Invention

This invention relates to dealkalised sheet glass. The invention also relates to a method of producing dealkalised sheet glass.

2. Background of the Related Art

It is known that glass, especially ordinary soda-lime glass is apt to weather when exposed to adverse environmental conditions. In particular, when sheets of ordinary soda-lime glass are exposed to a warm, humid, calm atmosphere, sodium ions at the surface of the glass are subject to hydrolytic attack, and this leads to deterioration in the light transmitting properties of the glass. The problem is particularly acute during storage (especially in hot countries) and transport (especially by sea) of stacked sheets of glass. In some circumstances, there can even be a reaction between contacting sheets which leads to their becoming firmly bonded together. It has also recently become apparent that sodium-rich glass used for facing liquid crystal displays can cause premature deterioration of the displays due to sodium poisoning. Further, there are many coatings which may be applied to glass for various purposes, and it has become apparent that the use of sodium-rich glass in many coated glass products presents certain disadvantages. It has been found that due to the presence of high proportions of sodium ions, such as are found in ordinary soda-lime glass, such coatings are sometimes insufficiently adherent to the glass, and that the ageing properties of the coated product are not as good as they might be. It has also been found that the presence of sodium ions tends to promote haze in the coated product, and this is particularly disadvantageous for transparent products to be used for glazing purposes.

Various solutions to this problem have been proposed. The use of glass of a special low-alkali composition has been suggested. This presents inconveniences in manufacture, though it may be justified for special products. It also adds appreciably to the cost of the glass. A further suggestion has been to apply a sodium-impervious coating of silica ($SiO_2$) to ordinary soda-lime glass, but this is also rather expensive.

It has been proposed to manufacture sheets of ordinary soda-lime glass and then to subject the sheets to a treatment which results in the production of dealkalised glass. For example, for the manufacture of mirrors, British Patent Specification No 294,391 suggests using an annealing furnace to reheat polished plate glass sheets to the annealing point and then subjecting the sheets to the action of an acid gas. In the Examples, finished glass sheets are reheated to 600° C. and exposed to an atmosphere containing sulphur dioxide for about 30 minutes. Relatively low temperature treatments are also known.

Such treatments result in a depletion of the alkali ion content in a thin surface layer of the glass. Typically such treatments are performed in such a way that the sodium ion concentration at a depth of a few hundred nanometers in unaffected by the treatment. It is convenient to relate the sodium ion concentration to the sodium content of the glass before any dealkalising treatment. Thus for a typical soda-lime glass, a sodium ion concentration of 100% may correspond to a sodium content of 12 to 14% (or thereabouts) calculated as $Na_2O$ by weight of the glass. The sodium ion concentration at various depths in the surface layer of the glass can be analysed in known manner by a proton bombardment technique which results in the conversion of $^{23}Na$ to $^{20}Ne$ with the evolution of an alpha particle. By monitoring proton and resonance energies and alpha particle emission it is possible to derive the sodium ion concentration at any depth beneath the surface with a resolution of 15 nm, and the results can be plotted to give a stepped line of sodium ion concentration against depth beneath the surface. When this stepped line is smoothed out (compare lines X in FIGS. 4 and 5) it will be seen that the sodium ion concentration increases with depth in almost linear fashion from an assumed zero sodium ion concentration at the surface until the 90% sodium ion concentration depth is reached, whereafter the plotted line moves up to 100% sodium ion concentration asymptotically. If that plot were strictly linear, the 50% sodium ion concentration depth would be 0.56 of the 90% depth. In fact values of 0.51 to 0.54 times the 90% sodium ion concentration depth are typical for the 50% sodium ion concentration depths of prior art dealkalised glasses, and for such known glasses, the shapes of the plots of sodium ion concentration against depth are all substantially similar.

It will be appreciated that the resulting dealkalised state of the glass surface is unstable in that there will be a tendency for sodium ions to migrate from within the depth of the glass towards the surface in order to re-establish an ionic population distribution there which is close to that of ionic equilibrium throughout the mass of glass. It will be appreciated that there are various factors which will govern the time taken for such equilibrium to be substantially re-established, and among the most important of these are the temperature of the glass and the extent to which the sodium ion concentration has been depleted in the surface layers of the glass. It will be appreciated that a given extent of surface dealkalisation can be expressed in terms of the depth at which the sodium ion concentration has a value of, for example, 50%, and that under similar conditions, because of the similar ion population distributions in previously known dealkalised glasses, as evidenced by the similar shapes of the plots of sodium ion concentration against depth, the benefit of any known dealkalised glass having a given 50% sodium ion concentration depth will be lost over a similar period of time.

SUMMARY OF THE INVENTION

It is an object of this invention to provide dealkalised sheet glass having new properties and in which the benefits of dealkalisation are retained for a longer period of time than is the case with previously known dealkalised glass of the same base composition which has been dealkalised to the same 50% sodium ion concentration depth and maintained under similar conditions.

According to the present invention, there is provided dealkalised sheet glass, characterised in that over at least a portion of the surface of the glass, the depth at which the sodium ion concentration is 90% of the maximum sodium ion concentration of the glass is at least twice the depth at which the sodium ion concentration is 50% of said maximum concentration, and the sodium ion concentration at a depth of 50 nm is not more than 50% of said maximum concentration.

Dealkalised glass in accordance with the present invention retains the benefits of dealkalisation for a longer period of time than does previously known dealkalised sheet glass of the same base composition which has been dealkalised to the same 50% sodium ion concentration depth and maintained under similar conditions. This better retention of the benefits of dealkalisation is attributed to the greater depth to which the glass is depleted in alkali metal ions. For a given 50% sodium ion concentration depth, the 90% sodium ion concentration depth, at which there will clearly be a 10% sodium ion depletion, is greater than has hitherto been achieved. This in turn leads to an increase in the mean length of the ion migration path required for the glass to return to a condition in which, close to its surface, there is a given alkali metal ion population distribution close to equilibrium.

Furthermore, because there is a greater distance between the 50% and 90% sodium ion concentration depths, the mean ion population gradient between those depths will be lower in sheet glass according to this invention than in previously known dealkalised glass, and because of this lower gradient, the tendency towards ionic migration will itself be reduced. Thus, not only will the mean migration path be longer, but also the mean migration speed will be lower.

A further advantage of such dealkalised sheet glass is that it can be made rapidly and economically. In particular, the present invention presents an economic advantage over the use of low alkali glass and over coating with silica as previously referred to, and the results achieved are sufficient to defer noticeable deterioration of a product comprising a sheet of such dealkalised glass for a time which is at least commensurate with the expected useful working life of products of that type.

The benefits afforded by the present invention, for a given 50% sodium ion concentration depth, are greater as the alkali metal ion population of surface layers of the glass is depleted and as the mean ion population gradient is reduced. For a given 50% sodium ion concentration depth, one indicator of such alkali metal ion population depletion and gradient is the depth at which the sodium ion concentration is 90%.

Accordingly, in preferred embodiments of the invention, over at least said portion of the surface of the glass, the depth at which the sodium ion concentration is 90% of said maximum concentration is at least 2.1 times, advantageously at least 2.5 times, and optimally at least three times the depth at which the sodium ion concentration is 50% of said maximum concentration. Each of these features promotes a greater sodium ion population depletion and a lower sodium ion population gradient between the 50% and 90% sodium ion concentration depths.

Another indicator of alkali metal ion population depletion and gradient is given by the relationship between the depth at which the sodium ion concentration is 80% and the depth at which the sodium ion concentration is 90%. If the sodium ion concentration increased in linear manner with depth up to a depth corresponding to 90% sodium ion concentration, it would be expected that the 90% sodium ion concentration depth would be 1.125 times the 80% sodium ion concentration depth. In previously known dealkalised glasses, factors of as much as 1.15 or 1.16 have been achieved. In preferred embodiments of the present invention, over at least said portion of the surface of the glass, the depth at which the sodium ion concentration is 90% of said maximum concentration is at least 1.2 times, preferably at least 1.3 times, and optimally at least 1.5 times the depth at which the sodium ion concentration is 80% of said maximum concentration. Each of these features promotes a greater sodium ion population depletion and a lower sodium ion population gradient between the 80% and 90% sodium ion concentration depths.

The benefits afforded by dealkalising glass are particularly manifest when an exposed surface layer of the glass has a low alkali metal ion content. Accordingly, in the most preferred embodiments of the invention, over at least said portion of the surface of the glass, the sodium ion concentration at a depth of 25 nm is at most 30% of said maximum concentration of the glass.

Dealkalised soda-lime glass is of particular commercial benefit.

As has been stated, the presence of a high alkali content at the surface of glass which is, or is to be, coated is disadvantageous because the presence of such alkali can adversely affect the quality of the coating. The present invention extends to dealkalised glass as herein defined which bears a coating.

As examples of such a coated glass product, mirrors may be cited. We have noted that in the formation of mirrors using ordinary soda-lime glass it has been essential that the silvering operation should be performed on freshly formed glass. On occasion it has happened that there has been a two to three day delay during shipment from the glass forming plant to the silvering plant, and it was found that this led to a noticeable loss of quality in the resulting mirrors. This loss of quality was attributed to natural migration or leaching of sodium ions from the untreated soda-lime glass due to the humidity to which it was exposed in transit and which resulted in a strongly adherent iridescent layer on the glass. The invention also includes coated, dealkalised glass as herein defined which forms a mirror. In fact if there is to be any substantial delay between dealkalising the glass and any further processing, such as silvering, we prefer not to wash the glass to remove the surface salts formed during the dealkalising process until this becomes necessary. The surface of the glass may thus remain in contact with a salt layer rich in alkali metal ions for some time. It is surprising that this practice allows the production of high quality mirrors.

The invention is also applicable to other products incorporating coated glass. Such coatings may be formed by various techniques to be performed at ambient temperature. The coatings may alternatively be formed by a vacuum deposition or other technique in which the glass becomes heated, though not to too high a temperature or for too long a period. It will be appreciated however, that any reheating will increase ion mobility within the glass and as a result, there will be a tendency for ionic equilibrium to be re-established. It is therefore important not to reheat the glass to a temperature which is greater than that at which dealkalisation took place.

The manufacture of the new dealkalised sheet glass as herein defined was made possible by our discovery of a new method of dealkalising glass.

According to the present invention, there is also provided a method of producing dealkalised sheet glass characterised in that the glass is dealkalised in stages, in one stage the glass being dealkalised by exposing it to contact by acid gas of a dealkalising medium for a period of at least 1 minute while the glass is above 400° C., and in a subsequent stage the thus dealkalised glass being further dealkalised by exposing it to contact by acid gas of a dealkalising medium for at least 3 minutes while the temperature of the glass is at least 50° C. below the temperature or the minimum temperature of the glass during said one stage, and is between 400° C. and 250° C.

The adoption of the method of the present invention enables the economic production of glass whose surface has a satisfactorily low alkali content so that its resistance to weathering will be significantly improved, so that any risk of sodium-poisoning of parts or coatings associated with the glass will be greatly reduced, and/or so that the adherence of any such coating will be improved. The results achieved are sufficient to defer noticeable deterioration of a product comprising a sheet of such dealkalised glass for a time which is at least commensurate with the expected useful working life of products of that type. In particular, a method according to the present invention readily enables the production of the new and advantageous dealkalised sheet glass hereinbefore defined.

The advantages afforded by a method according to the present invention are attributed to the conditions under which the dealkalising treatment takes place. Exposing the glass to a dealkalising medium while its temperature is in excess of 400° C. during said one stage of the treatment promotes rapid dealkalising of the surface of that material: ensuring that the glass is further dealkalised in said subsequent stage at a lower temperature has been found to promote a particular alkali metal ion population distribution in the layers immediately beneath that surface which militates against the subsequent migration of alkali metal ions from the interior of the material towards its surface as has been described in relation to the dealkalised glass according to this invention, so that on further cooling, the surface of that glass is not only low in alkali metal ions, but is uniformly low.

The temperature of the glass and its effect on the speed of migration of alkali metal ions in the glass has particular importance for the way in which the invention is best performed.

High temperature promotes rapid removal of ions from the surface of the glass as referred to above, but equally it promotes rapid migration of ions from the interior of the glass to its surface layers as the alkali metal ion population of the glass seeks equilibrium. It is essential that the glass should be at a lower temperature during the or a said subsequent stage in which it is exposed to the dealkalising medium than it was during the said one stage. As the temperature of the glass drops, ion migration within the glass slows down, and accordingly, the alkali metal ions from the interior of the glass do not move so rapidly into the surface layers of the glass. If those surface layers are exposed to the dealkalising medium during such cooling, alkali metal ions continue to be removed from the surface layers of the glass so that they remain dealkalised. For a similar reason, it is desirable to allow the glass to cool rather rapidly as soon as it is no longer exposed to the dealkalising medium. It will be appreciated however that if the glass is to be cooled rapidly, it will be less susceptible to thermal shock the lower is the temperature at which such rather rapid cooling starts, and it is therefore desirable to postpone such rather rapid cooling until the glass is at a sufficiently low temperature that it will not become unduly stressed thereby.

It is not necessary that the glass should be dealkalised to a great depth in order to give a significant improvement in weathering and other properties of the glass. We have noted that the surface layer of the glass which is relatively poor in alkali ions at the end of a said dealkalising treatment may only be a few hundred nanometers in thickness: at a depth of 500 nm, the composition of the vitreous material may be substantially unaffected by the dealkalising treatment.

In fact the original object of our researches was not so much to provide a new dealkalised glass having the advantageous properties outlined above. That was an unexpected bonus. Our aim was rather to find a more convenient and economical way of making dealkalised sheet glass than had hitherto been achieved. This new method is based on a discovery that a satisfactory dealkalisation of glass can be obtained quite rapidly. This is very much more convenient from the manufacturing point of view, and is also more economical than known dealkalising processes, since it enables the costs entailed in heating the glass to be reduced.

If the glass is exposed to the dealkalising medium at very high temperatures, in concentrations suitable for dealkalising at lower temperatures, the glass may be subject to such attack that its optical quality and finish can easily be impaired. If a high optical quality of the product is of special importance it is therefore desirable to dealkalise at lower temperature, and it is advantageous that the maximum temperature of the glass during said one stage is below 500° C.

The extent of dealkalisation will depend inter alia on the temperature of the glass when it is exposed to the acid gas. It is preferred that the glass is exposed to said dealkalising medium for a period of time during which its temperature is at least 450° C. Such a high temperature promotes rapid migration of alkali metal ions within the glass, and accordingly promotes rapid dealkalisation.

Advantageously, in said subsequent stage, the glass is exposed to said dealkalising medium for a period of time during which its temperature is between 375° C. and 300° C. As has been noted, ion migration slows down with lower glass temperature, and the adoption of this feature gives a very favourable compromise between the rate at which alkali ions can be removed from the surface of the glass sheet and the rate at which the alkali ion population of the surface layers of the glass is replenished by ionic migration from within the depths of the glass.

In the most preferred embodiments of the invention, in said subsequent stage, the glass is exposed to said dealkalising medium for a period of at least 3 minutes during which its temperature is below 350° C. The adoption of this feature is of particular value in permitting a high degree of net alkali extraction from the surface layers of the glass.

Preferably, in said subsequent stage, the glass is exposed to said dealkalising medium for a period of time during which its temperature is below 300° C. The adoption of this feature is also of value in discouraging replenishment of the alkali ion population in the surface layers of the glass, and it can facilitate subsequent rapid cooling of the glass.

It is found particularly beneficial if said glass is caused or allowed to cool progressively from its maximum temperature during said one stage to the end of said subsequent stage, and alternatively, or in addition, it is preferred that said glass is continuously exposed to dealkalising medium from the start of said one stage to the end of said subsequent stage. The adoption of either or both of these features promotes the establishment of an alkali ion population distribution in the surface layers of the glass which is especially favourable for retaining the benefits of dealkalisation for a long period of time.

Advantageously, the acid gas used in said subsequent stage is the same acid gas as that used in said one stage, but in a more concentrated dealkalising medium. The adoption of this feature is of significant practical importance. There is a relatively rapid removal of alkali metal ions from the surface of the glass at higher temperature, but equally, there is a relatively rapid migration of alkali metal ions from the interior of the glass sheet to its surfaces. Exposure of the glass to the acid gas at the higher temperature prepares the glass by initiating removal of the alkali metal ions preparatory to a continued removal of those ions by larger quantities of the acid gas at a lower temperature at which migration from the interior is much less rapid. In this way a considerable reduction in the alkali metal ion concentration in the surface layers of the glass can be established and frozen in, to result in a highly favourable alkali metal ion population distribution in the surface layers of the glass.

There are a number of acid gases which could be used in a method according to this invention. Among such gases may be cited HCl. However the use of hydrochloric acid gas will in general present serious handling problems and also give rise to severe erosion of the chamber in which dealkalisation takes place, and it is preferred that said acid gas comprises sulphur trioxide. It will be appreciated that sulphur trioxide itself is not easy to handle, but it does have the advantage that it can be generated in situ. Preferably, said sulphur trioxide is introduced into said dealkalising medium by passing sulphur dioxide over an oxidation promoting catalyst under oxidising conditions. Sulphur dioxide is relatively less noxious than the trioxide. Vanadium pentoxide is a very suitable catalyst for promoting oxidation of sulphur dioxide, and its use for that purpose is preferred.

In fact the reactions which appear to take place during oxidation of the sulphur dioxide are

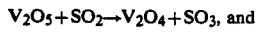

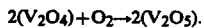

It will be apparent that for continuous operation without replenishment of the catalyst the second reaction must proceed as fast as the first. The speed of the second reaction is promoted when the reaction takes place at elevated temperature in an excess of oxygen.

Advantageously therefore, sulphur dioxide is passed over a said oxidation promoting catalyst so that oxidation takes place at a temperature of at least 400° C. This promotes oxidation of the sulphur dioxide, and indeed enables 90% or more of the sulphur dioxide to be converted to sulphur trioxide. Furthermore, it is preferred that sulphur dioxide is passed over a said oxidation promoting catalyst in admixture with an excess of air, the air being present in an amount at least three times (and preferably at least five times) that which is stoichiometrically necessary for the complete oxidation of the sulphur dioxide. The use of such an excess of air as carrier gas helps not only to promote oxidation, but also to give a better and more uniform distribution of the sulphur trioxide in the atmosphere of the dealkalising chamber.

When glass is attacked by sulphur trioxide, a thin film of sodium sulphate, sulphate bloom, will form on the surface of the glass. If the reaction with the glass is too strong, this can lead to irregular surface treatment, thus giving rise to surface defects in the glass. Furthermore, the sulphate bloom will itself form a barrier against further reaction between the sulphur trioxide and the glass.

Advantageously, said dealkalising medium includes an organic fluorine compound which will decompose to release fluorine ions at the temperature of the glass in a region where such compound contacts the glass. This has been found to inhibit the formation of sulphate bloom.

For the most effective dealkalisation, the period of time between first and last exposure of the glass to said dealkalising medium is at least ten minutes, as is preferred.

The present invention can with advantage be used to dealkalise the surfaces of a sheet of a glass of a special low alkali composition, but it is presently envisaged that the invention will give the greatest benefits when the glass treated is a soda-lime glass, for example a glass containing at least 8% alkali, calculated as weight per cent sodium oxide in the glass.

The method of the invention is especially suitable for the batch-wise dealkalisation of sheets of glass. Alternatively, the dealkalising treatment may be performed on a ribbon of glass passing through an annealing lehr.

The present invention is equally applicable to the treatment of glass formed by the well known float process and to the treatment of glass which has been continuously drawn upwardly from a bath of molten glass in a drawing chamber.

The adoption of the present invention is particularly appropriate for conferring improved properties on relatively thin sheet glass.

The invention extends to dealkalised sheet glass made by a method as hereinbefore defined, and includes any product incorporating a sheet of dealkalised glass as hereinbefore defined, and any product formed by applying a coating to a sheet of dealkalised glass as hereinbefore defined.

BRIEF DESCRIPTION OF THE DRAWINGS

The present invention will now be described in greater detail by way of specific practical Examples and with reference to the accompanying diagrammatic drawings in which:

FIGS. 4 to 7 are graphs showing sodium content in surface layers of sheets of dealkalised glass.

DESCRIPTION OF THE PREFERRED EMBODIMENTS

Figure 1:
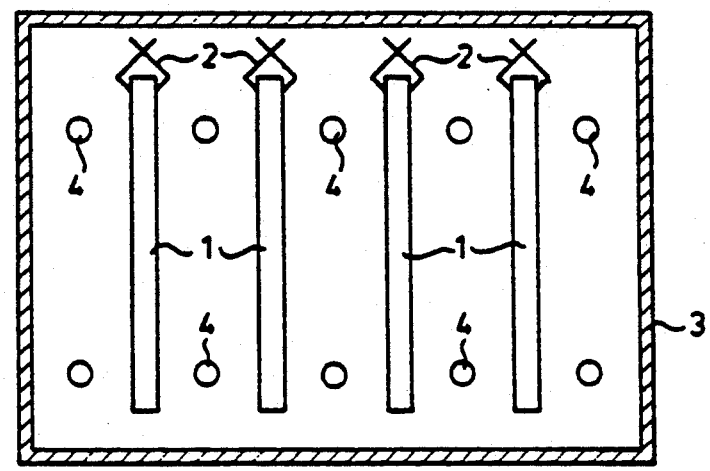
FIGS. 1 to 3 show three embodiments of treatment chamber for performing a dealkalising treatment in accordance with this invention.

EXAMPLE 1 (FIGS. 1 and 4)

In FIG. 1, a plurality of glass sheets 1 are held supported by tongs 2 in a heatable chamber 3 provided with gas inlet openings 4 for batchwise dealkalisation. Gas vents are also provided.

To ease handling of the acid gas, each acid gas inlet duct preferably comprises a catalyst for the in situ oxidation of sulphur dioxide. Furthermore, each such duct preferably comprises heating means so that the temperature therein can be maintained at a value of at least 400° C. to promote such oxidation.

In a specific practical Example, 2 mm thick sheets of drawn soda-lime glass having an alkali metal content of 12 to 14% calculated as weight per cent sodium oxide in the glass were introduced into the chamber 3 which was heated to a temperature of 490° C. A mixture of 5 L/h sulphur dioxide and 1000 L/h air was fed to the acid gas inlet openings. (The stoichiometric requirement for oxidation of 1 L sulphur dioxide is about 2.5 L air.) The glass was allowed to cool at a rate of 15° C./min, and when the glass had cooled to 370° C., the rate at which the sulphur dioxide was fed to the chamber 1 was increased to 40 to 50 L/h in between 1000 and 2000 L/h air. The glass was further allowed to cool at the same rate to 320° C. when the rate of introduction of sulphur dioxide was increased to between 70 and 80 L/h sulphur dioxide in an excess of air. Each inlet duct contained vanadium pentoxide as catalyst to promote oxidation of the sulphur dioxide. The ducts were heated to a temperature in excess of 400° C. so that at each duct in excess of 90% of the sulphur dioxide was oxidised. The introduction of sulphur dioxide was halted before the glass temperature dropped to 250° C. The sheets were exposed to the acidic medium in the chamber for a period in excess of ten minutes.

The thus dealkalised glass was then subjected to two tests, a haze test and a lixiviation test, and the results were compared with those given by a specimen of glass of the same composition which was untreated.

The haze test consisted of subjecting the glass to a cyclic temperature variation of 45° C. to 55° C. and back to 45° C., 24 cycles per day, in an atmosphere having a relative humidity of 99%. The untreated soda-lime glass exhibited iridescence after 2 to 3 days. The specimen of dealkalised glass did not exhibit iridescence until after 17 days had passed.

In the lixiviation test, the specimens of glass were immersed for 30 minutes in water at a temperature of 86° C., and the water was subsequently analysed for its sodium content. From the untreated glass, it was found that more than 5 mg sodium was extracted from the glass per square meter surface area. From the dealkalised glass, only 0.3 mg sodium was extracted per square meter surface area.

The result of the lixiviation test indicates that the dealkalisation afforded by the use of the present invention is very effective.

In a variant of this Example, a fluorine containing gas, namely difluoroethane or tetrafluoromethane, was mixed with the sulphur dioxide introduced through the inlet ducts in an amount of 10% by volume $SO_2$. Each of these gases decomposes to liberate fluorine ions which tend to reduce the formation of sulphate bloom on the faces of the glass.

The alkali metal ion population distribution in surface layers of the resulting product were measured by a known technique in which the glass surface is bombarded with protons. The sodium ion concentration at various depths so measured is plotted as curve I in the graph of FIG. 4 as a percentage of the maximum sodium ion concentration against depth beneath the surface. Curve X represents a similar plot resulting from tests made on glass of the same composition which was dealkalised by a comparative technique in such a way that the sodium ion concentrations of the two glasses were 50% at the same depth, namely about 78 nm, beneath the surfaces. In that comparative technique, the glass was treated for a period of 45 min at a constant temperature of 280° C. using sulphur trioxide at a rate of 90 L/h. Various monitored results appear in the following Table 1 for the inventive glass I and the comparative test sample X.

TABLE 1

|  | Glass I (Example 1) | Glass X |
| --- | --- | --- |
| Concentration at depth 25 nm | 20% | 20% |
| Depth at 50% concentration | 78 nm | 78 nm |
| Depth at 80% concentration | 145 nm | 130 nm |
| Depth at 90% concentration | 250 nm | 151 nm |
| 90% depth:50% depth ratio | 3.20 | 1.94 |
| 90% depth:80% depth ratio | 1.72 | 1.16 |

EXAMPLE 2 (FIGS. 1 and 5)

Sheet soda lime glass 1 having an alkali metal content of 12 to 14% calculated as weight per cent sodium oxide in the glass was heated in the chamber 3 to a temperature of 470° C. and was exposed to a dealkalising atmosphere for a period of 3 minutes. The glass was cooled at a rate of 20° C. per minute and was maintained at a temperature of 350° C. for a period of 6 minutes. The dealkalising atmosphere was maintained by introducing sulphur trioxide into the chamber at a rate of 20 L/h. After the treatment, the net sodium depletion in the surface of the glass was measured by an X-ray fluorescence technique and was found to be (in terms of sodium ions extracted) 19 mg/m². Sodium salts removed from the surface of the glass after the treatment corresponded to a quantity of 31 mg Na⁺ per square meter, indicating a high degree of in-depth dealkalisation. The alkali metal ion population distribution in surface layers of the resulting product was measured by proton bombardment, and the results are plotted as a percentage of the maximum sodium ion concentration against depth beneath the surface as curve I in the graph of FIG. 5. Curve X represents a similar plot resulting from tests made on glass of the same composition which was dealkalised by preheating it to 280° C. and exposing it for 70 minutes to a dealkalising atmosphere maintained by introducing sulphur trioxide at a rate of 90 L/h. After this comparative treatment, the net sodium depletion in the surface of the glass was measured by an X-ray fluorescence technique and was found to be (in terms of sodium ions extracted) 22 mg/m². Sodium salts removed from the surface of the glass after the treatment corresponded to a quantity of 22 mg Na⁺ per square meter, indicating a poor in-depth dealkalisation. Various monitored results appear in the following Table 2 for the inventive glass I and the comparative test sample X.

TABLE 2

|  | Glass I (Example 2) | Glass X |
| --- | --- | --- |
| Concentration at depth 25 nm | 26% | 11% |
| Depth at 50% concentration | 58 nm | 112 nm |
| Depth at 80% concentration | 152 nm | 130 nm |
| Depth at 90% concentration | 235 nm | 180 nm |
| 90% depth:50% depth ratio | 4.05 | 1.85 |
| 90% depth:80% depth ratio | 1.54 | 1.15 |

The thus dealkalised glass was then subjected to two tests, a haze test and a lixiviation test, and the results were compared.

The results of these tests were broadly similar, but it is to be borne in mind that the comparative specimen was subjected to a very much longer dealkalising treatment using a much greater quantity of dealkalising medium, and that its 50% concentration depth is almost twice as great as that of the glass dealkalised in accordance with this Example.

The result of the lixiviation test indicated that the dealkalisation afforded by the use of the present invention is very effective.

EXAMPLE 3 (FIG. 2)

Figure 2:
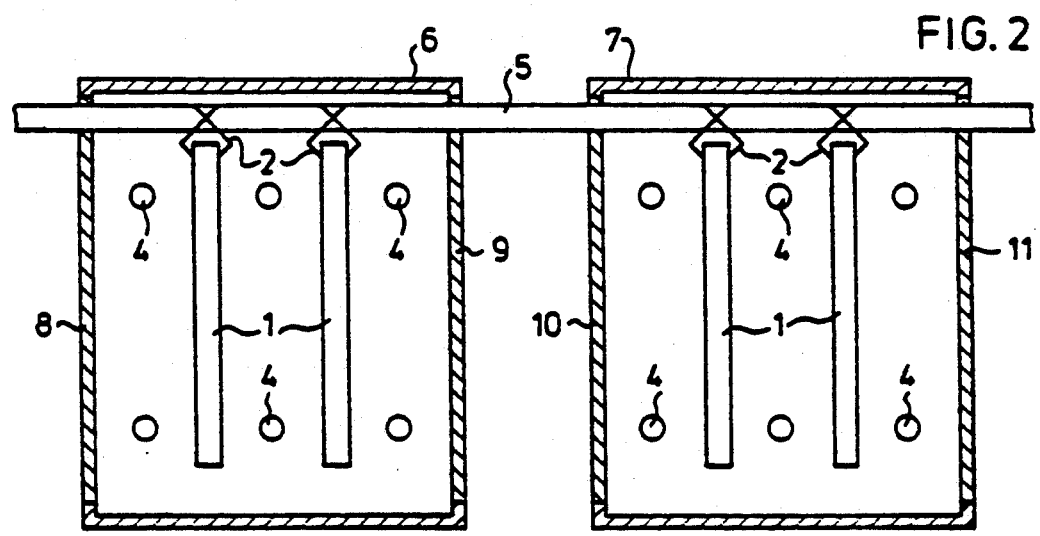

FIG. 2 shows apparatus for use in a continuous stepwise process for dealkalising sheet glass. The glass sheets again indicated at 1 are again held by tongs 2, but in this case the tongs 2 are mounted for transport along a rail 5 so that they can be moved through a high temperature chamber 6 for one treatment stage, and a lower temperature chamber 7 for a subsequent treatment stage. The two chambers have respective inlet and outlet doors 8, 9, 10 and 11 to allow such movement, and as before they are provided with gas inlet openings 4, and gas vents.

In a specific practical example, 2 mm thick sheets of drawn soda-lime glass, preheated to 470° C., were passed into the first chamber 6 which was maintained at that temperature. A mixture of about 20 L/h sulphur dioxide and 1000 L/h air was fed to the chamber through inlet ducts which contained vanadium pentoxide as catalyst to promote oxidation of the sulphur dioxide, and in excess of 90% of the sulphur dioxide was in fact oxidised. The glass remained in that chamber for a period in excess of 1 minute, and was then transferred to the second chamber 7 which was maintained at a temperature of 340° C. A mixture of between 50 and 60 L/h sulphur dioxide and between 1000 and 2000 L/h air was fed to that second chamber. The glass was exposed to the dealkalising media in the two chambers for a total period in excess of ten minutes.

The thus dealkalised glass was then subjected to the haze and lixiviation tests specified in Example 1, and the results were compared with those given by a specimen of glass of the same composition which was untreated.

In the haze test, the untreated soda-lime glass exhibited iridescence after 2 to 3 days. The specimen of dealkalised glass did not exhibit iridescence before about 19 days had passed.

In the lixiviation test, it was found that more than 5 mg sodium was extracted from the untreated glass per square meter surface area. From the dealkalised glass, only about 1 mg sodium was extracted per square meter surface area.

The result of the lixiviation test indicates that the dealkalisation afforded by the use of the present invention is very effective.

In a variant of that example, a fluorine containing gas, namely difluoroethane or tetrafluoromethane, was mixed with the sulphur dioxide introduced through the inlet ducts in an amount of 10% by volume $SO_2$. Each of these gases decomposed to liberate fluorine ions which tended to reduce the formation of sulphate bloom on the faces of the sheets.

Figure 3:
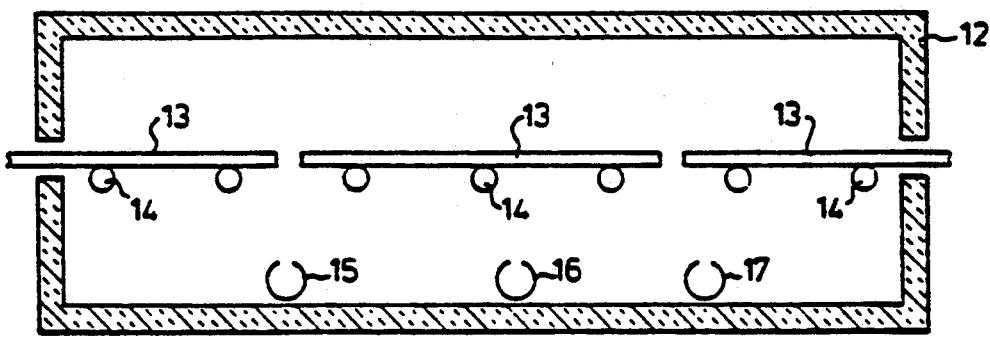

EXAMPLE 4 (FIGS. 3 and 6)

FIG. 3 illustrates a horizontal tunnel 12 for use in a continuous process of dealkalising glass sheets. The glass sheets 13 pass along the tunnel 12 while supported on conveyor rolls 14. The tunnel 12 contains three gas discharge ducts 15, 16, 17 located well spaced beneath the level of the sheets 13.

A further specific practical Example is for dealkalising sheets of soda-lime glass having an alkali metal content of 12 to 14% calculated as weight per cent sodium oxide in the glass. The sheets were of drawn glass and were passed along the tunnel illustrated at a speed of about 2 m/min. A mixture of 5 L/h sulphur dioxide and an excess of air was fed to the first discharge duct 15 where the glass temperature was 470° C. A like mixture was fed at the same rate through the second discharge duct 16 where the glass temperature was 350° C., and a mixture of 74 L/h sulphur dioxide and an excess of air was fed to the third acid gas discharge duct 17 where the glass temperature was 300° C. Each duct contained vanadium pentoxide as catalyst to promote oxidation of the sulphur dioxide. Ducts 16 and 17 were heated to a temperature in excess of 400° C. to promote the oxidation reactions. The glass was exposed to the dealkalising medium in the tunnel for a period in excess of ten minutes.

It was found that this treatment resulted in the removal of 23 mg/m² of sodium from the surface of the glass.

This was a highly effective dealkalising treatment.

The sodium content of surface layers of a sheet of the glass was measured by a nuclear resonance technique, and the results appear as the graph of FIG. 6 in which the abscissa indicates depth below the surface of the glass in nanometers and the ordinate represents the proportion of the original sodium which remains in the glass. It will be seen that at the surface practically all the sodium has been removed, while at a depth of 100 nm over 50% of the original sodium remains in the glass, and at depths greater than 400 nm, the sodium content of the glass is substantially unaffected.

Various monitored results appear in the following Table 3.

TABLE 3

|  | Glass of Example 4 |
|---|---|
| Concentration at depth 25 nm | 24% |
| Depth at 50% concentration | 70 nm |
| Depth at 80% concentration | 154 nm |
| Depth at 90% concentration | 205 nm |
| 90% depth:50% depth ratio | 2.92 |
| 90% depth:80% depth ratio | 1.33 |

EXAMPLE 5 (FIGS. 3 and 7)

In a variant of Example 4, the feed rates of the sulphur dioxide - air mixture through the second and third acid gas discharge ducts (16 and 17 respectively) were altered each to 46 L/h sulphur dioxide in an excess of air, all other conditions remaining as specified in that Example. It was found that this treatment resulted in the removal of 24 mg/m² of sodium from the surface of the glass. When the sodium content of surface layers of a sheet of this glass was measured by a nuclear resonance technique, the results were plotted as a graph, and that graph appears as FIG. 7.

Various monitored results appear in the following Table 4.

TABLE 4

|  | Glass of Example 5 |
|---|---|
| Concentration at depth 25 nm | 30% |
| Depth at 50% concentration | 60 nm |
| Depth at 80% concentration | 160 nm |

TABLE 4-continued

| | Glass of Example 5 |
|---|---|
| Depth at 90% concentration | 215 nm |
| 90% depth:50% depth ratio | 3.25 |
| 90% depth:80% depth ratio | 1.34 |

Dealkalised glass being the product resulting from the process of any of the foregoing Examples is very suitable for subsequent coating.

Such a coating may be a single layer coating, or a multi-layer coating. Various vacuum deposition techniques which are known per se for use in conjunction with untreated glass or glass of special compositions may be used for example for the deposition of a coating comprising tin oxide. Alternatively, the dealkalised glass may be subjected to a classical silvering treatment for the production of a mirror.

In variants of any of the foregoing Examples, one face of the glass is provided with a pyrolytic tin oxide coating prior to the dealkalising treatment. The dealkalising treatment has little effect on the tin oxide layer and does not affect the subjacent surface of the glass, but the other face of the glass is very effectively protected against weathering.

In variants of Examples 4 and 5, the tunnel 12 is constituted as an annealing lehr interposed between a glass ribbon forming machine and a sheet cutting installation.

What is claimed is:

1. A method of producing dealkalized sheet glass in which sheet glass is dealkalized in stages, the method comprising:
   a. dealkalizing sheet glass in a first stage by exposing the sheet glass to contact with a first dealkalizing medium comprising at least one acid gas consisting essentially of an acid gas selected from the group consisting of sulfur trioxide and hydrogen chloride for a period of at least 1 minute while the sheet glass is at a temperature above 400° C.; and
   b. further dealkalizing the sheet glass in a subsequent stage by exposing the sheet glass after the first stage to contact with a second dealkalizing medium comprising at least one acid gas consisting essentially of an acid gas selected from the group consisting of sulfur trioxide and hydrogen chloride for a period of at least 3 minutes while the sheet glass is at a temperature which is one of at least 50° C. below the temperature of the sheet glass during said first stage and the minimum temperature of the sheet glass during said first stage, and ranges between 400° C. and 250° C.

2. The method according to claim 1, wherein said sheet glass has a maximum temperature during said first stage, and wherein the maximum temperature is below 500° C.

3. The method according to claim 1, wherein said sheet glass has a maximum temperature during said first stage, and wherein the maximum temperature is above 450° C.

4. The method according to claim 1, wherein the sheet glass is exposed in said subsequent stage to said second dealkalizing medium for a period of time during which its temperature ranges between 375° C. and 300° C.

5. The method according to claim 1, wherein the sheet glass is exposed in said subsequent stage to said second dealkalizing medium for a period of at least 3 minutes during which the sheet glass has a temperature which is below 350° C.

6. The method according to claim 1, wherein said sheet glass is exposed in said subsequent stage to said second dealkalizing medium for a period of time during which the sheet glass has a temperature which is below 300° C.

7. The method according to claim 1, wherein said sheet glass has a maximum temperature during said first stage, and wherein said sheet glass is one of caused to cool and allowed to cool progressively from its maximum temperature during said first stage to the end of said subsequent stage.

8. The method according to claim 1, wherein said sheet glass is continuously exposed to dealkalizing medium throughout said first stage and said subsequent stage.

9. The method according to claim 1, wherein the same at least one acid gas is used in the first and second dealkalizing medium, and wherein the second dealkalizing medium has a concentration of said at least one acid gas which is higher than that of the first dealkalizing medium.

10. The method according to claim 1, wherein said sulfur trioxide is introduced into said first and second dealkalizing medium by passing sulfur dioxide over an oxidation promoting catalyst under oxidizing conditions.

11. The method according to claim 10, wherein vanadium pentoxide is used as said oxidation promoting catalyst.

12. The method according to claim 10, wherein sulfur dioxide is passed over said oxidation promoting catalyst so that oxidation takes place at a temperature of at least 400° C.

13. The method according to claim 10 wherein sulfur dioxide is passed over said oxidation promoting catalyst in admixture with an excess of air, the air being present in an amount at least three times that which is stoichiometrically necessary for the complete oxidation of the sulfur dioxide.

14. The method according to claim 1, wherein at least one of said first and second dealkalizing medium includes an organic fluorine compound which will decompose to release fluorine ions at the temperature of the sheet glass in a region thereof where said organic fluorine compound contacts the sheet glass.

15. The method according to claim 1, wherein the sheet glass is exposed to said first and second dealkalizing medium for a total period of time which is at least ten minutes.

16. The method according to claim 1, wherein the sheet glass is a soda-lime glass.

17. The method according to claim 1, wherein the first and second stages produce a dealkalized sheet glass consisting essentially of sheet glass having a core region which is not dealkalized, having a normal sodium ion concentration which continues to be maintained in the core region of the sheet glass, and having a surface which is dealkalized to a depth such that a sodium ion concentration gradient exists, and wherein for said sodium ion concentration gradient:
   (a) sodium ion depletion is maximum at the surface,
   (b) the depth at which the sodium ion concentration is 90% of the normal sodium ion concentration is at least twice the depth at which the sodium ion concentration is 50% of the normal sodium ion concentration, and (c) the sodium ion concentration at a depth of 50 nm is not more than 50% of the normal sodium ion concentration, wherein a long-lasting dealkalization is achieved because of a reduced tendency to ionic migration due to the shape of said sodium ion concentration gradient.

18. A method of producing dealkalized sheet glass in which sheet glass is dealkalized in stages, the method comprising:

(a) dealkalizing sheet glass in a first stage by exposing the surface of the sheet glass to a first dealkalizing medium comprised of at least one acid gas for a period of at least 1 minute while the sheet glass is maintained at a stage one temperature ranging above 400° C.; and (b) further dealkalizing the sheet glass in a second subsequent stage by exposing the surface of the sheet glass to a second dealkalizing medium comprised of at least one acid gas for a period of at least 3 minutes while the sheet glass is maintained at a stage two temperature which is at least 50° C. below the stage one temperature or the minimum of the stage one temperature range, and which ranges between 250° C. and 400° C.

wherein the first and second stages produce a dealkalized sheet glass having a core region which is not dealkalized, having a normal sodium ion concentration which continues to be maintained in the core region of the sheet glass, and having a surface which is dealkalized to a depth such that a sodium ion concentration gradient exists, and wherein for said sodium ion concentration gradient:

(a) sodium ion depletion is maximum at the surface, (b) the depth at which the sodium ion concentration is 90% of the normal sodium ion concentration is at least twice the depth at which the sodium ion concentration is 50% of the normal sodium ion concentration, and (c) the sodium ion concentration at a depth of 50 nm is not more than 50% of the normal sodium ion concentration, whereby a long-lasting dealkalization is achieved because of a reduced tendency to ionic migration due to the shape of said sodium ion concentration gradient.

* * * * *